Patented Aug. 18, 1953

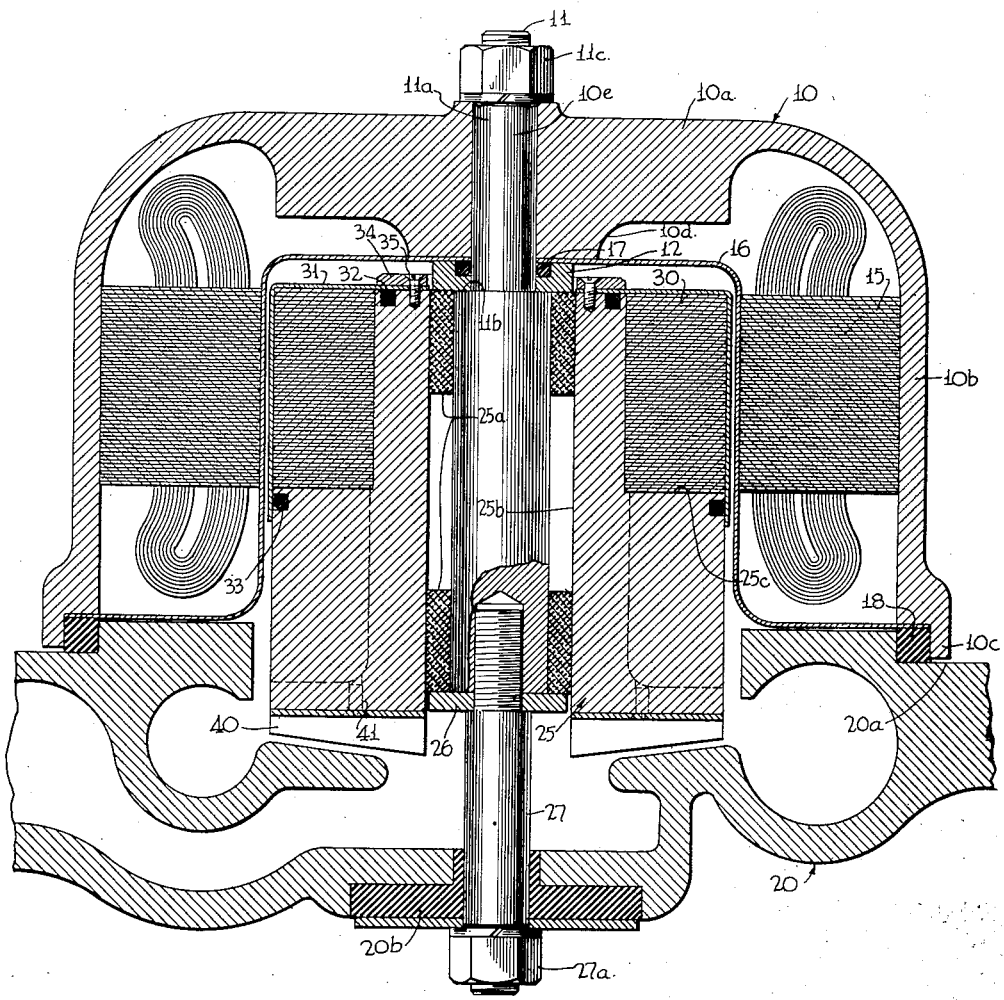

2,649,048

UNITED STATES PATENT OFFICE 2,649,048

FLUID-SHIELDED DYNAMOELECTRIC DEVICE FOR IMMERSED PUMPS AND THE LIKE

Rinaldo F. Pezzillo, Audubon, N. J., and Anthony H. Pezzillo and George C. Tatem, Philadelphia, Pa., assignors to Mono Products Inc., Philadelphia, Pa., a corporation of Pennsylvania Application April 6, 1950, Serial No. 154,286

7 Claims. (Cl. 103—87)

This invention relates to a dynamoelectric device, usually called simply a dynamo, and including motors, generators, and the like, suitable for immersion in a fluid such as water, oil, or the like, and particularly relates to a motor-pump unit where the pump, mixer, impeller or other drive must be immersed in a liquid and where the motor also is subject to contact with the liquid, and has for an object the provision of improvements in this art.

One of the particular objects of the invention is to provide a dynamo, especially a motor, assembly in which both stator and rotor are carried by a single cup-shaped casing, the stator being sealed in the casing by a non-magnetic cover shield and the rotor having a bearing support on the casing, leaving its outer end free for a pump or other drive means.

Another object is to provide a simple sealing means for the stator, the sealing means comprising a non-magnetic cover shield enclosing the stator with the casing and separating it from the rotor.

Another object is to provide a sturdy rotor mounting on the casing, the mounting including a shaft fixed in an end wall of the cup-shaped casing and having a protruding stub end portion on which the rotor is mounted.

Another object is to provide sealing means for the armature of the rotor, the same comprising a non-magnetic cover shield which encloses the armature with the rotor and separates it from the stator and from the exterior space whereby it is kept free from harmful contact with liquids or air.

Another object is to provide a dynamo, especially a motor, in which both the rotor and armature are sealed from the outside and separated from each other, there being two complete partition elements formed by the shields in the gap between stator and rotor, more specifically between the stator field element and the rotor armature element.

Another object is to provide a rotor having an end accessible for the attachment of a pump runner, pulley, or the like.

Another object is to provide a supplemental supporting frame or casing, as for a pump housing or the like, which secures the stator cover shield in place.

The above and other objects and advantages of the invention will be apparent from the following description of an exemplary embodiment, reference being made to the accompanying drawings, wherein:

The single figure is a typical axial section through a motor-pump assembly embodying the present invention.

Referring to the specific embodiment of the invention illustrated in the drawing, a cup-shaped main casing 10 includes an end wall 10a, a peripheral wall 10b, an external end flange 10c, and an interior end boss 10d. The end wall and boss are provided with a hole or bore 10e to receive the reduced end 11a of a fixed shaft 11. A washer 12 is secured between the shoulder 11b of the shaft 11 and the end of the boss 10d and the shaft is rigidly held in position by one or more nuts 11c.

An annular stator 15, of a type well known in alternating current induction motors, is secured within the casing 10. The stator is fully enclosed by a cup-shaped cover shield 16 of non-magnetic material which is highly resistant to corrosion, sheet stainless steel being suitable for this purpose. The cup-shaped cover shield is sealed in place at its edges, preferably in a removable manner, as by a sealing ring 17 at its bottom and by another sealing ring 18 at its out-flanged free end.

A known type of O ring of rubber-like composition suitable for the required uses of the device may be used at some or all of the seal joints. Neoprene, for example, is suggested where long life and oil resistance are required. The ring 17 is held upon the edges of the bottom of the cover shield, where the cover shield is apertured to receive the reduced end 11a of shaft 11, by the washer 12 when clamped by the nut 11c and shoulder 11b. The ring 18 is secured in a recess or groove in the end of the casing 10 by being clamped by the flange 20a of such supplemental casing 20 as may be provided with the motor assembly. The illustrated form is a pump assembly. The ring 18 is here made oversize to act as a vibration damper.

The stator chamber may be filled with the usual oil or compound and the side-wall portion of the cup-shaped cover shield is preferably pressed into the interior of the stator. This gives it a true circular shape, permits it to be made of very thin material, and occupies a minimum of the flux gap between stator and armature.

A rotor 25 is rotatably mounted on the shaft 11 and is retained by a cap 26 and a shaft extension 27 secured to the end of the main shaft. The shaft extension is anchored in an insulating resilient bushing 20b, as of rubber, neoprene, or the like, secured in the bottom of the end casing 20. The bushing also seals the space around the shaft extension. A washer together with a nut 27a clamps the casing 20 to the casing 10 but additional fastening means may be used near the periphery if desired. Bearing bushings 25a, preferably of a self-lubricating type pressed into the bore 25b of the rotor, have rotation on the enlarged portion of the shaft 11.

The motor rotor armature 30, of the usual high-silicon steel laminations is secured in a recess 25c of the rotor. The armature is preferably also fully enclosed by a cover shield 31 which is tightly pressed on the armature and down on its sealing rings 32 at the end, and 33 on the side. This cover shield, like the other, is non-magnetic and corrosion-resistant, preferably being made of stainless steel. The side ring 33 is tightly held by the cylindrical side wall of the cup-shaped cover shield 31. The bottom ring 32 and the edges of the cover shield around the aperture in the center may be held by an annular ring or washer 34 secured to the end of the rotor by screws 35.

A pump impeller 40 is shown to be secured to the end of the rotor body, as by screws 41. The usual centrifugal pump chambering is provided in the casing 20, the inlet being at the center and the outlet at the periphery.

It is thus seen that the invention provides an improved fluid-shielded dynamo which is suitable for immersion in fluids or for use in corrosive atmospheres. A full and complete shielding is provided for both the stator and the armature. Heretofore the armature shielding, if provided at all, has consisted of electroplating over the periphery of the laminations but this is not durable and breaks away between plates so that corrosion reduces the usefulness of the rotor. The present full cover shield which is pressed on the rotor keeps the armature safe for a greater time than has heretofore been attainable.

The impeller 40 and casing 20 can be quickly removed and replaced by other equipment, the casing or frame 20 being clamped by the nut 27a, only, in most cases and the impeller by a few screws 41. The device may be operated without the outer shaft-extension 27 since the shaft 11 alone is rigid enough for most uses.

The device is very simple and easily made and is very sturdy and durable. Due to the arrangement of parts it may be readily adapted to reversal of parts, the part here called the rotor being fixed and the stator and casing being rotatable after reversal. It will be appreciated that by such reversal and by putting impellers on the casing the device may, with conventional known electrical modifications, be used as a generator or the like, as by being placed in a stream of flowing fluid. This reversal will be obvious from its mention and needs no illustration. It is referred to merely as showing the advantages which flow from the divided casing arrangement and the means for attaching selectable parts to either rotor or stator. Also the dual shielding of both rotor and stator greatly contributes to this universality of use.

While one embodiment of the invention has been illustrated and described by way of example it is to be understood that there may be various embodiments within the general scope of the invention.

What is claimed is:

1. In a liquid shielded dynamo, such as a motor for driving a pump, in combination, a cup-shaped continuous-wall liquid-impervious outer casing, an annular stator in said outer casing, a cup-shaped stator cover shield of thin non-magnetic material having an outer flange at the open end disposed over the stator and sealed at its flange to the outer margin of said outer casing to provide, with the outer casing, a liquid-proof enclosure for the stator, a shaft rigidly mounted in the bottom of said outer casing and extending upwardly therefrom within said stator and its cover shield, elements on said shaft and outer casing adjacent the bottom of the outer casing securing said stator cover shield at its bottom in sealing relation to said outer casing, a rotor body rotatably mounted on said shaft within said stator and its cover shield, an armature on said rotor, a cup-shaped cover shield of thin non-magnetic material disposed over the armature and sealed at the margins to said rotor body to provide, with the rotor body, a liquid-proof enclosure for the armature, a driven element drivingly mounted on the rotor body at the end away from the bottom of said outer casing, and an end casing enclosing said driven element, said end casing having a peripheral flange securing the outer edge of the stator cover shield to the outer edges of said outer casing.

2. In a liquid shielded dynamo, such as a motor for driving a pump, mixer, or other immersed device, in combination, a cup-shaped continuous-wall liquid-impervious outer casing having a shaft opening in its bottom wall and an interior boss for shaft support, a shaft secured in said opening and extending upwardly within said outer casing, an annular stator in said outer casing, a cup-shaped stator cover shield of non-magnetic material over the stator having an opening in its bottom receiving the shaft, a washer disposed above said stator cover shield around the shaft, an annular sealing ring engaging the stator cover shield beneath said washer, the shaft having a shoulder pressing said washer and sealing ring against said stator cover shield, means sealing the outer edge of the stator cover shield to the outer edge of the outer casing, and a rotor carrying an armature rotatably mounted on said shaft within said outer casing, stator, and stator cover shield.

3. In a liquid-shielded dynamo, in combination, a cup-shaped casing having a shaft supported in the bottom and projecting upward interiorly, a rotor carrying an armature rotatably mounted on said shaft, the rotor having a recess receiving said armature, a cover shield carried by the rotor enclosing said armature, said cover shield having free edges adjacent spaced zones on the rotor, and sealing rings engaging the free edges of said cover shield tightly securing them in sealing relation to the rotor at the spaced zones to completely seal the armature against fluids, and an annular stator in said casing.

4. In a liquid-shielded dynamo, in combination, a cup-shaped liquid-impervious stator casing, a fixed shaft disposed within and extending upwardly from the bottom of the casing, a rotor body having a bearing on said shaft, said casing and body having relative rotation and one each carrying the armature and the field of the dynamo, and a full cover shield of thin non-magnetic sheet metal over each, the armature and field, the cover shields each at the free edges being sealed to the stator casing and rotor body, respectively, and both having wall portions disposed concentrically between the armature and field.

5. In a liquid-shielded dynamo, in combination, a cup-shaped liquid-impervious stator casing, an annular stator field assembly in said casing, a complete cup-shaped edge-flanged nonmagnetic cover shield over said stator field assembly within said stator casing and field assembly and sealed at its flange edges to the outer edge of said stator casing, a shaft secured in the bottom of said stator casing and securing the bottom of the stator cover shield to the bottom of the stator casing, a rotor body carrying an armature rotatably mounted on said shaft within said stator casing and field assembly, a working element mounted on the outer end of said rotor body, a frame around said working element and having a rim overlying the free edge of the cup-shaped stator casing, a separable shaft extension secured to the outer end of said shaft, and means on said shaft extension securing said frame to said stator casing, the outer edge of the stator cover shield being secured between the outer edge of said frame and the outer edge of said stator casing.

6. Apparatus as set forth in claim 5, further characterized by the fact that a resilient bushing is provided between said shaft extension and said frame.

7. A motor-pump assembly, comprising in combination, a cup-shaped stator casing having an outer flanged edge and being provided with a shaft opening and an interior boss in the bottom, a shaft rigidly secured in the bottom opening of the stator casing and having its stub end projecting into the casing, an annular stator field assembly secured in said stator casing, a cup-shaped stator cover shield of thin metal of nonmagnetic character having a shaft-receiving opening in its bottom and being secured at its bottom in sealing relationship to said boss by being clamped upon the boss by a shoulder on said shaft, the stator cover shield having an outturned end flange sealed to the outer flanged edge of said casing, a rotor body rotatably mounted on said shaft within said stator cover shield, said rotor body having an annular angular recess at the inner end adjacent the bottom of the casing, an armature assembly mounted in said recess, a cup-shaped armature cover shield of thin nonmagnetic metal secured at its bottom in sealing relationship to the inner end of said rotor body and having its upper edge sealed to the rotor body beyond the upper edge of the armature, a pump impeller secured on the outer end of said rotor body, a pump casing around said impeller, a separable shaft extension secured to the end of said shaft, a resilient mounting between the end of said shaft extension and the bottom of said pump casing, said pump casing having a rim securing the upper flanged edge of the stator cover shield to the upper edge of the stator casing, and means on said shaft extension clamping said pump casing against said stator casing.

RINALDO F. PEZZILLO.
ANTHONY H. PEZZILLO.
GEORGE C. TATEM.

References Cited in the file of this patent

UNITED STATES PATENTS

| Number | Name | Date |
|---|---|---|
| 1,781,082 | Ruegger | Nov. 11, 1930 |
| 1,974,183 | Gunderson | Sept. 18, 1934 |
| 1,983,262 | Zorzi | Dec. 4, 1934 |
| 2,004,866 | Haldeman | June 11, 1935 |
| 2,310,422 | Gold | Feb. 9, 1943 |
| 2,497,650 | Anderson | Feb. 14, 1950 |

FOREIGN PATENTS

| Number | Country | Date |
|---|---|---|
| 214,643 | Great Britain | Oct. 16, 1924 |